(12) United States Patent
Sakraschinsky

(10) Patent No.: US 9,421,481 B2
(45) Date of Patent: Aug. 23, 2016

(54) FILTERING DEVICE

(75) Inventor: Michael Sakraschinsky, St. Ingbert (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 309 days.

(21) Appl. No.: 13/261,727

(22) PCT Filed: Jan. 12, 2012

(86) PCT No.: PCT/EP2012/000119
§ 371 (c)(1),
(2), (4) Date: Sep. 25, 2013

(87) PCT Pub. No.: WO2012/119674
PCT Pub. Date: Sep. 13, 2012

(65) Prior Publication Data
US 2014/0076794 A1    Mar. 20, 2014

(30) Foreign Application Priority Data

Mar. 6, 2011    (DE) .......................... 10 2011 013 186

(51) Int. Cl.
*B01D 29/52*    (2006.01)

(52) U.S. Cl.
CPC ............ *B01D 29/52* (2013.01); *B01D 2201/02* (2013.01); *B01D 2201/0407* (2013.01); *B01D 2201/0415* (2013.01); *B01D 2201/0453* (2013.01); *B01D 2201/24* (2013.01); *B01D 2201/291* (2013.01); *B01D 2201/60* (2013.01)

(58) Field of Classification Search
None
See application file for complete search history.

(56) References Cited

U.S. PATENT DOCUMENTS

| | | | | |
|---|---|---|---|---|
| 2,921,686 A | * | 1/1960 | Forman | B01D 29/114 210/323.2 |
| 3,151,962 A | * | 10/1964 | O'Dell | B01D 46/002 210/483 |
| 3,216,572 A | * | 11/1965 | Kasten | B01D 29/15 210/352 |
| 4,702,754 A | | 10/1987 | Blocker | |
| 2009/0321339 A1 | | 12/2009 | Suzuki et al. | |

FOREIGN PATENT DOCUMENTS

| | | |
|---|---|---|
| DE | 33 40 382 A1 | 5/1984 |
| DE | 43 38 100 C1 | 12/1994 |
| DE | 197 11 589 A1 | 9/1998 |
| DE | 201 12 561 | * 10/2001 |
| DE | 201 12 561 U1 | 10/2001 |
| EP | 0 613 394 B1 | 7/1998 |
| WO | WO 2010/004315 A2 | 1/2010 |

* cited by examiner

*Primary Examiner* — Benjamin Kurtz
(74) *Attorney, Agent, or Firm* — Wenderoth, Lind & Ponack, L.L.P.

(57) ABSTRACT

A filtering device includes multiple filtering elements (3) with bodies defining longitudinal axes. The filtering elements (3) are arranged adjacent to one another in a housing such that the longitudinal axes extend parallel to one another. The bodies of at least some of the filtering elements (3) have a shape that deviates from a circular cylinder at at least one part of the body length. The filtering elements (3) with bodies having a shape deviating from a circular cylinder have a cross-sectional size at least partially changing from one end to the other end. The filtering elements are oriented in the housing such that the regions of a larger cross-section are associated with the regions of a smaller cross-section in adjacent filtering elements.

17 Claims, 7 Drawing Sheets

FILTERING DEVICE

FIELD OF THE INVENTION

The invention relates to a filtering device comprising a plurality of filtering elements with bodies defining longitudinal axes and arranged adjacent to one another in a housing such that the longitudinal axes of the filtering elements extend parallel to one another. The bodies of at least some of the filtering elements have a shape that deviates from a circular cylinder in at least one part of the body length. The invention further relates to a filtering element that is provided for use in such filtering device.

BACKGROUND OF THE INVENTION

Filtering devices of this kind are often used in technical facilities for filtering process liquids and pressure liquids such as hydraulic oils, coolant lubricants, and for treating liquid media and the like. Facilities that use such filtering devices can often only provide a limited amount of usable space for incorporating or attaching the filtering device. However, to be able to filter correspondingly large volume flows, the filtering surface that is provided by the filtering device must be sufficiently large. With regard to this requirement, a known filtering device of this kind is disclosed, for example, in DE 10 2004 026 862 A1. That device provides for filtering elements having bodies that deviate from the cross-section of a circular cylinder form, having the form of a Reuleaux triangle instead. In comparison to devices having circular cylindrical or block-shaped filtering elements, the shape of the Reuleaux triangle accommodates a larger filtering area inside a given installation space.

SUMMARY OF THE INVENTION

An object of the present invention to provide a filtering device that allows for a further improvement of the ratio between the installation space and the achievable filtering area.

According to the invention, this object is basically achieved with a filtering device including the filtering elements with cross-sections deviating from the cross-section of the circular cylinder shape and with cross-sections having sizes that change, at least in part, from one end to the other end. The filtering elements are oriented inside the housing such that the filtering elements adjacently disposed relative to each other have areas with larger cross-sections paired with areas having smaller cross-sections. Correspondingly, in a group of filtering elements containing filtering elements that are disposed next to each other and paired with each other and thereby forming a single group, more slender areas are disposed across from the thicker areas of the adjacently disposed partner element. Any free spaces or unused "dead space" within the group can then be minimized, achieving a correspondingly high packing density with an optimally large filtering area.

Especially advantageously, filtering elements in form of tapered candle filters are used, which are disposed adjacent to each other. The tapering of those candle filters are oriented in opposite directions, respectively. In this case, the filtering elements that are arranged into a group of adjacently disposed filtering elements delimit funnel-type fluid spaces inside the filter housing. Obvious combinations of convex external geometries with concave structures are also possible. This way, for example, layer-cake-shaped filtering elements can be combined with each other by providing that one convex layer-cake-shaped ring, in each case, engages in a concave recess between two adjacently disposed convex layer-cake-shaped rings of the other filtering element, preferably while maintaining a radial spacing. Aside from such stepwise ring arrangement, continually changing structures are conceivable as well, which provide for a barrel-like filtering element having a central, convexly protruding barrel part that engages, leaving a spacing, in a concave recess of an adjacent filtering element having a hose-shaped configuration, such that a rotational hyperboloid is formed. The abovementioned spacings between individual filtering elements are necessary for any sensible routing of the fluids inside the filter housing. All of the filtering elements constituted in this manner are preferably configured as rotationally symmetrical.

In especially advantageous embodiments, the filtering elements are tapered candle filters disposed inside the filter housing between a planar base plate and a cover plate that is disposed in a parallel plane in relation to the base plate. The corresponding result is a pot-shaped filter housing that receives the filtering elements by mounts on the base plate. An axial spacing exists between the ends of the filtering elements and the top cover plate.

Especially advantageously, the base plate can be configured as a connection plate and provided with fluid openings that can be used to bring fluid passages in fluid communication with the inner filtering cavities of the filtering elements. The elements are held by their ends on the base plate.

With candle filters having a tube-like support structure and a filtering medium surrounding the inside filtering cavity, especially advantageously, the ends of the tube-like support structure, allocated to the base plate, can constitute the fluid passages and engage with the fluid openings of the base plate, when each filtering element is in the functional position thereof.

On a base plate that serves as a connection plate, a closure piece can be located at the ends of the tube-shaped support structure on the filter candles, where the inner filtering cavities are allocated to the cover plate. The closure piece seals each filtering cavity in a fluid-proof manner.

Regarding the connection of the candle filters that are directed toward the base plate by the slender ends thereof, advantageously the tube-shaped support structure is extended by a connection tube, which engages in the related fluid opening and is axially secured on the base plate.

If candle filters are provided that include an external tube-shaped support structure, the support structure can form a radially protruding annular edge on the thicker end thereof. For candle filters having the thick end thereof oriented toward the base plate, this edge can be a contact area on the base plate.

On the more slender end, the internal support structure can form a cylinder part, which passes through a hollow cylindrical collar on the slender end of the external support structure. The collar is axially secured on the cylinder part. After disengaging this secured connection, the external support structure of the candle filter can be pulled off, for example, to replace the filter medium.

Especially advantageously, the collar can include a step constituting a shoulder, which is disposed in the radial plane. The annular edge of the external support structure of the respectively adjacent candle filter grips there-across. The annular edge of the external support structure thus constitutes a stop element for axially securing the candle filters inside the group.

To support the candle filters on the cover plate, spacers can be provided, respectively, on the collar of the external support structure and on the closed thicker end of the internal support structure. Preferably, they are formed thereto in one piece.

Another subject-matter of the present invention is a filtering element that is provided for use in the context of a filtering device according to the invention.

However, groups of filtering elements having varying cross-sections that are combined with such filtering elements having identical cross-sections inside the same filter housing, for example in the customary cylindrical design, also fall within the scope of the present invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
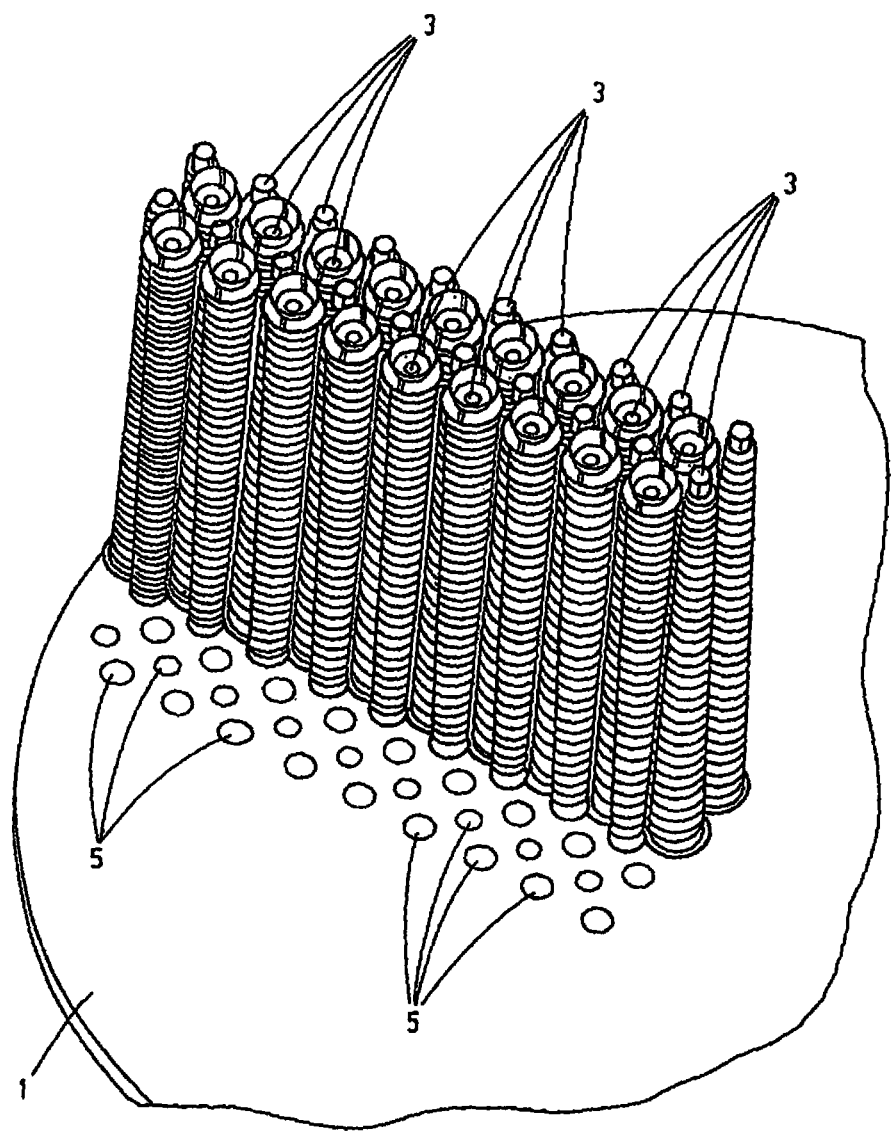
FIG. 1 is a schematically simplified, functional perspective view of a part of the base plate of the filter housing and a partial group of the filtering elements disposed on the base plate of a filtering device according to an exemplary embodiment of the invention.

FIG. 1 only depicts a partial section of the base plate 1, which is part of the embodiment of the filtering device according to the invention that shall be presently described and that is part of a filter housing, which is not shown in further detail. Base plate 1 accommodates a plurality of filtering elements formed as tapered candle filters 3 (in FIG. 1, not all of the candle filters are identified by reference numerals). As shown in FIG. 1, the candle filters 3 are grouped as densely packed, wherein the order thereof as provided is as follows.

In one given row, the candle filters 3 are oriented with the more slender or small ends thereof towards the base plate 1 and, in the respectively given adjacent row, the candle filters 3 are oriented with the thicker or large ends thereof toward the base plate 1. The sequential rows of candle filters 3 are offset in relation to one another, respectively following such an arrangement in that the candle filters 3 that are in consecutive rows are disposed inside the gaps left by the respectively previous row.

Figure 5:
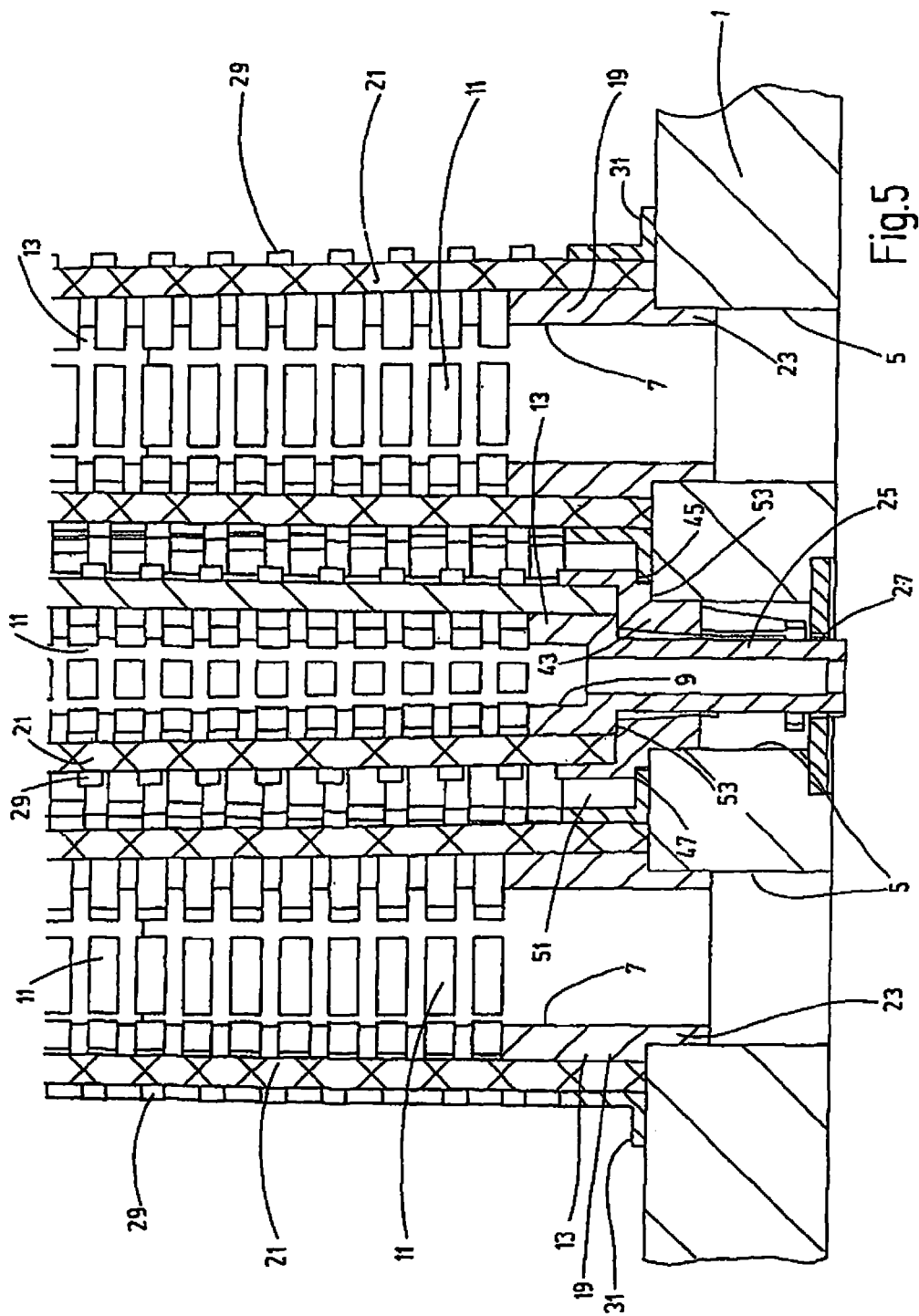
FIG. 5 is an enlarged, partial side view in section of only part of the filter candles on the base plate of FIG. 2.
Figure 6:
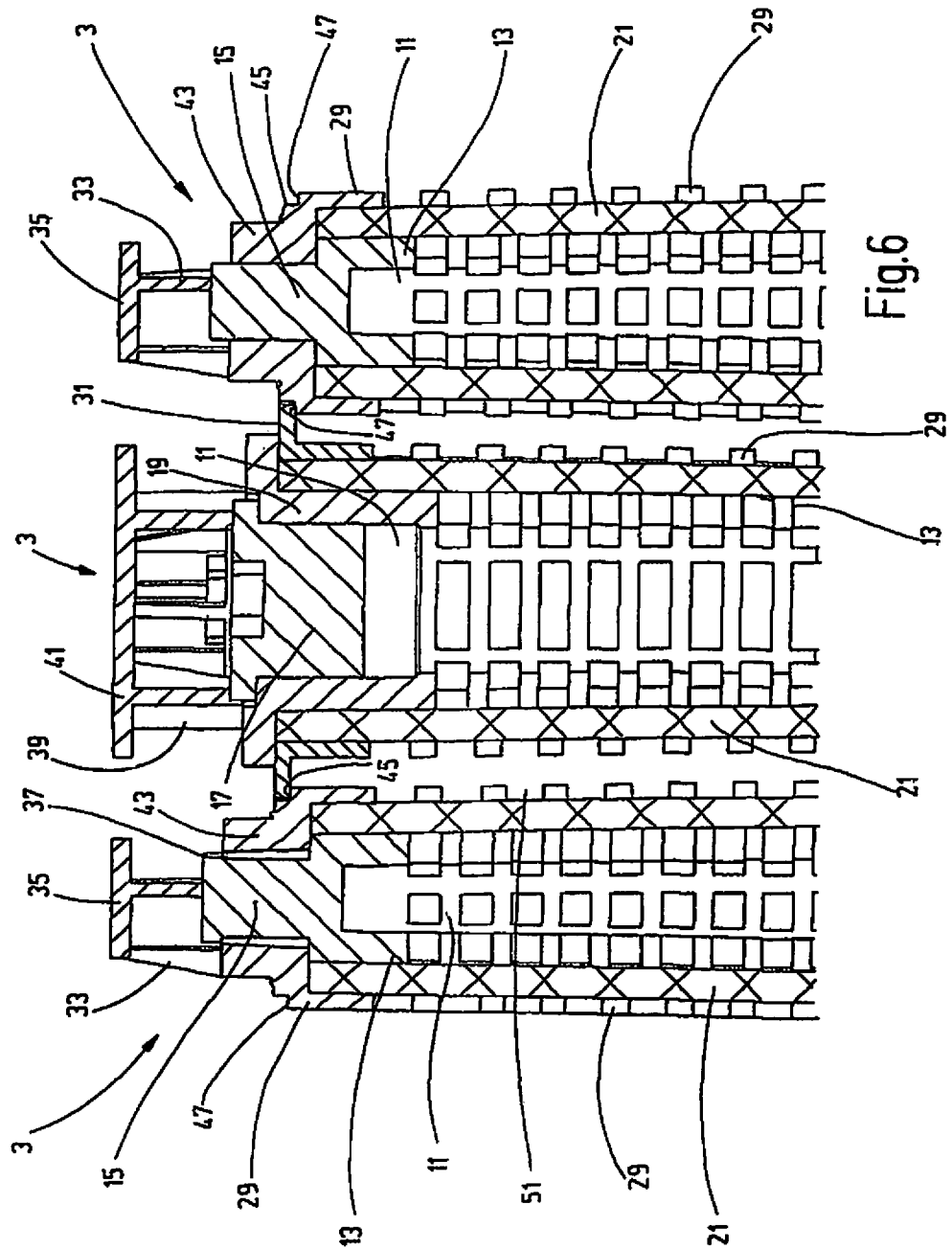
FIG. 6 is an enlarged, partial side view in section of only the partial area of FIG. 2 that borders on the cover plate, which is not shown.
Figure 7:
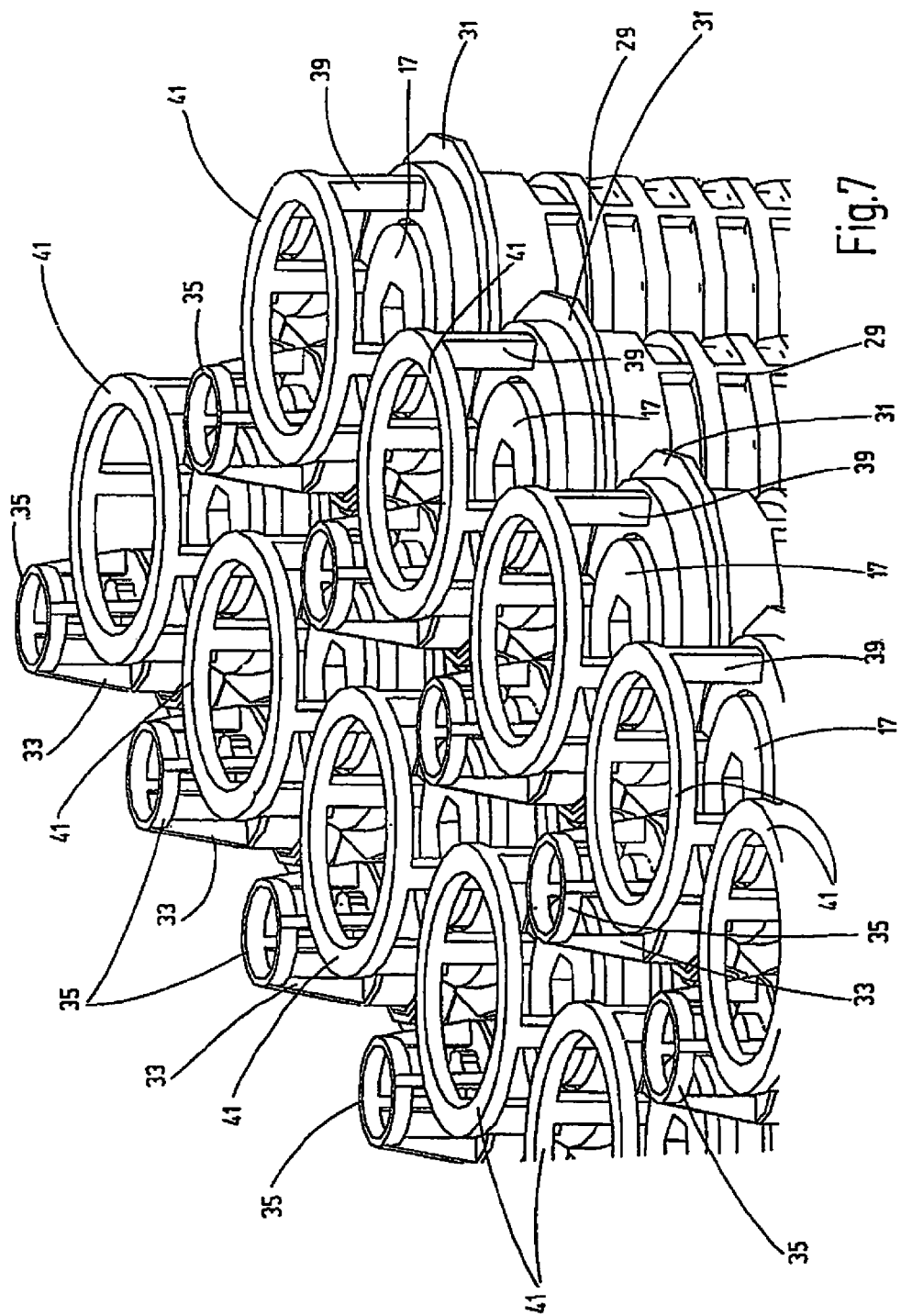
FIG. 7 is an enlarged, partial perspective view of only the partial area of the group of candle filters from the group shown in FIG. 1 that borders on the cover plate.

Only a partial group of the total number of candle filters 3 is depicted in FIG. 1. The side wall, constituting a hollow cylinder, and the cover plate disposed in a parallel plane opposite in relation to the base plate 1 have also been omitted. During the filtration process, the internal space of the filter housing that surrounds the candle filters 3 constitutes the untreated side 51 (FIGS. 5 and 6). The untreated fluid that must be cleaned can be supplied to untreated side 51 via a fluid inlet. The base plate 1 is configured as a connection plate and includes a fluid opening 5 for each candle filter 3 (in FIG. 1, not all of the candle filters are identified by reference numerals). The candle filters 3 are held or clamped between the cover plate and the base plate 1 such that the fluid passages 7 and 9, see FIGS. 2 and 5, which are disposed at the thicker or large end or the more slender end of the candle filters 3, respectively, are in fluid communication with the openings 5 of the base plate 1. These fluid passages 7, 9 constitute the outlet from of the respective internal filter cavity 11 of the candle filters 3. The internal fluid cavity constitutes the clean side during the filtration process, such that the cleaned fluid flows out of the filter housing via the openings 5 of the base plate 1.

Figure 2:
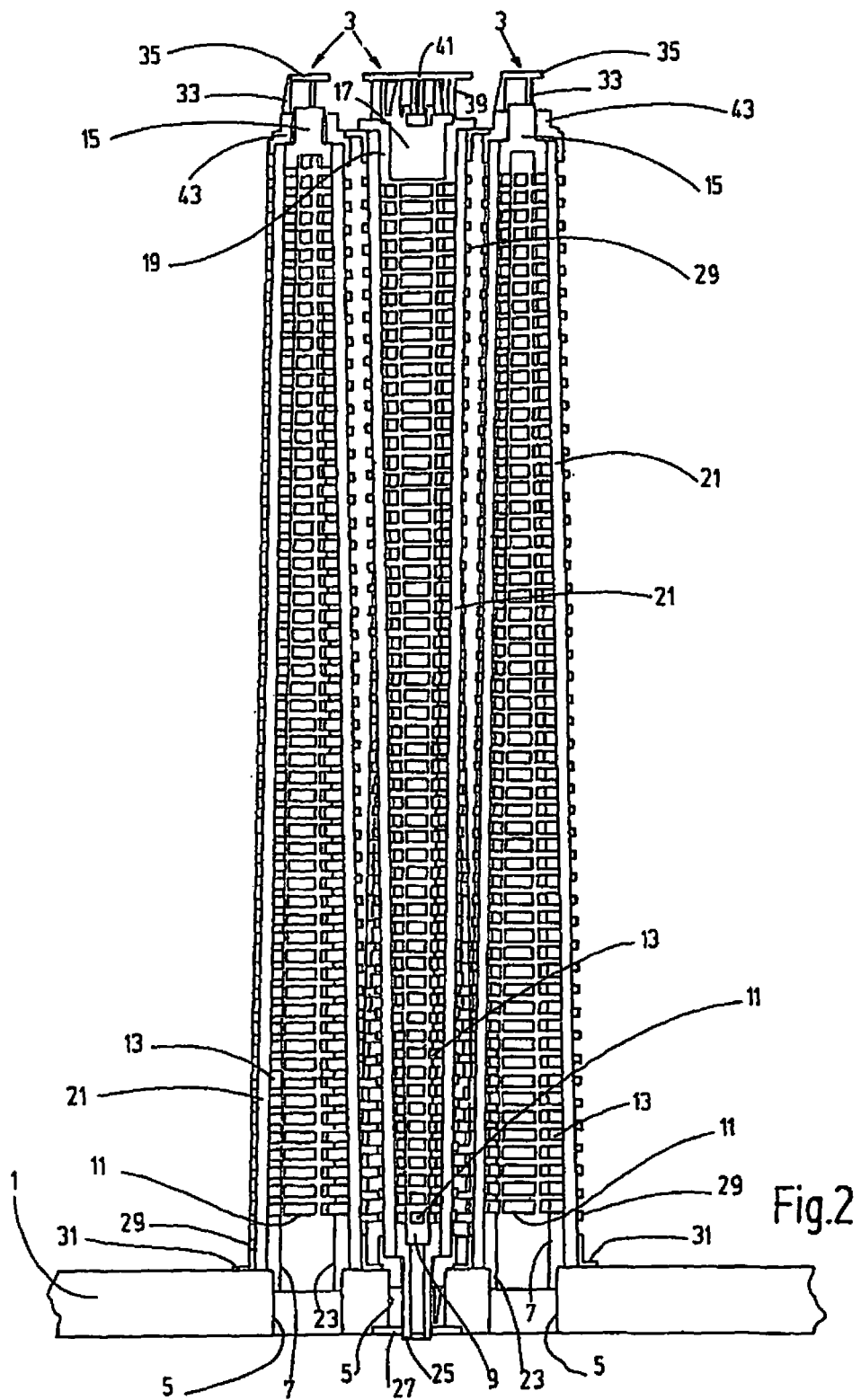
FIG. 2 is a schematically simplified, side view in section of only a partial group of tapered candle filters on a partial section of the base plate of FIG. 1.
Figure 3:
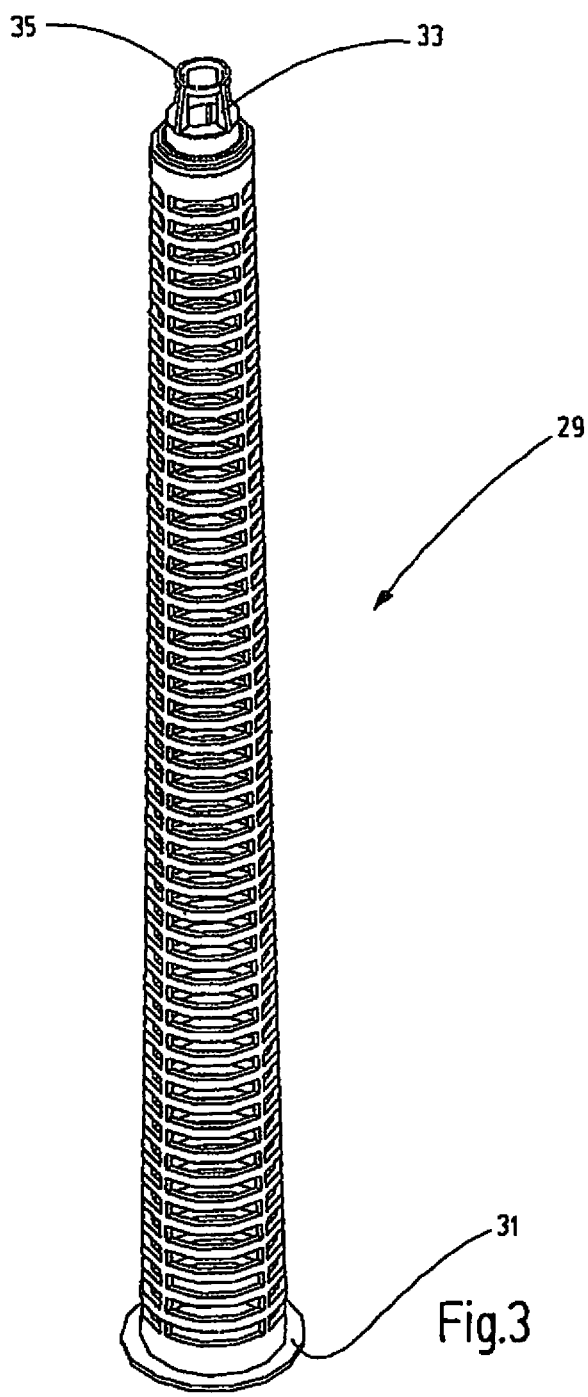
FIG. 3 is a perspective view of only the external support structure of a candle filter for use in the filtering device of FIG. 1.

In FIGS. 2, 3 and 6, the candle filters 3 each feature an identical tapering. The ends of the filter cavities 11, however, are configured differently, depending on whether the candle filters 3 are disposed in fluid communication with the openings 5 by the more slender ends thereof or by the thicker ends thereof. More precisely, the filter cavity 11, which is open at the bottom end due to the passages 7 and 9, and connected by the openings 5 of the base plate 1, is closed at the opposite end that is depicted as the top end in the drawing. Regarding tapered candle filters, it is known in the art that a tube-like internal support structure 13 defines the internal filter cavity 11. As most clearly visible in FIG. 6, on the candle filters 3 that are closed at the more slender or small top ends thereof, a cylinder part 15, which is formed in one piece to the end of the support structure 13, constitutes the closure of the filter cavity 11. However, on each thicker, closed top end, an end part 19 of the internal support structure 13, with screwed-in closure plug 17 configured as having a closed wall part, constitutes the closure piece of the internal filter cavity 11.

A filter mat 21, disposed on the outside of the internal support structure 13 can be provided, for example, as a non-woven filtration material, such as a non-woven polyester or the like, which is placed around the support structure 13. Alternatively, a fiber application can be directly applied to the support structure 13 by a melt-blown process. The type and specification of the respective filter medium 21 will depend on the purpose of use and the operating conditions of the filtering device.

At the end that is oriented toward the base plate 1, the internal support structure 13 forms, together with the closed end part 19, a connection piece 23 for the engagement in the corresponding opening 5 of the base plate 1. The candle filters 3 that are oriented with the more slender ends thereof toward the base plate 1 include, instead of the cylinder part 15 serving as closure piece, a connection tube 25 formed in one piece with the internal support structure 13 and passing through the related opening 5. The tube 25, and thereby the candle filter 3, is axially secured inside the opening 5. In the present example, a bayonet catch 27 is provided for this purpose. Alternately, providing a clip for securing the screwed connection is also possible.

Figure 4:
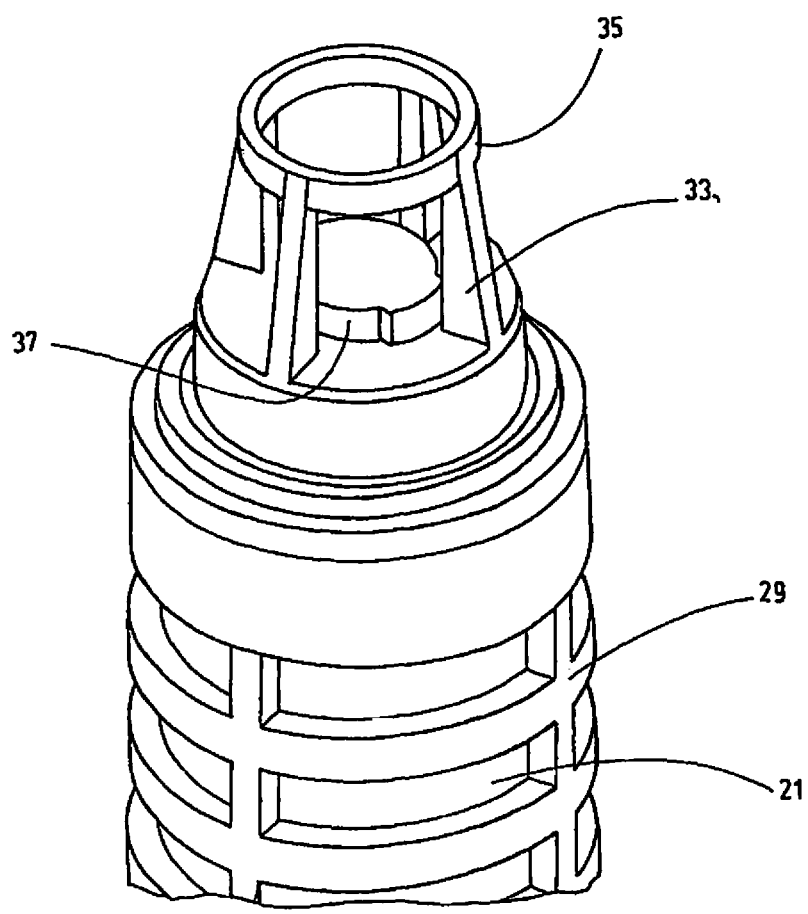
FIG. 4 is an enlarged, partial perspective view of only the more slender end of the external support structure of FIG. 3.

In the present example, the candle filters 3 include an external, tube-like support structure 29 that surrounds the outer side of the filter medium 21, which is shown separately in FIG. 3. The outer support structure 29 is a grate-shaped structure, like the internal support structure 13, preferably press-formed in one piece of a plastic material. Structure 29 can accommodate a through-flow of fluid through the openings that are provided by the grate structure. At the thicker end, the support structure 29 forms a radially protruding annular edge 31, which rests against the base plate 1 in the installed state. Formed in one piece with the opposite, closed end of the support structure 29 is a removal part 33, showing a removal ring 35 for manually extracting the filtering element from the filter housing. The outer support structure 29 is connected to the cylinder part 15 by a bayonet attachment 37, which is hinted at only in FIG. 4. After releasing the bayonet 37, the external support structure 29 can be drawn off and removed. Corresponding to the removal part 33 of the respectively closed ends of the candle filters 3, the removal parts 39, which are disposed on the thicker, closed ends, are provided with the removal rings 41, corresponding to the removal rings 35 on the more slender ends.

The annular edges 31 on the external support structure 29 form a kind of toothing with the more slender ends of the external support structure 29 of adjacent candle filters to provide mutual, axial cohesion of the group of the candle filters 3. More precisely, as shown particularly in FIG. 6, the external support structures 29 include on the ends thereof a collar 43 that forms a type of a hollow cylinder. The cylinder part 15 of the internal support structure 13 passes therethrough. The collar 43 constitutes a circumferential step 45 that forms a shoulder area 47, which is disposed in the radial plane, and that reaches over the annular edge 31 of the thicker end of the external support structure 29 of the respectively adjacent candle filter 3, as demonstrated particularly in FIGS. 5 and 6.

With the group of candle filters 3 cohesively held together in this manner by the base plate 1, the untreated side 51 is sealed off from the clean side that is located inside the filter cavity 11, by sealing edges 53 that are formed, as hinted at in FIG. 5, on the collar 43 of the internal support structure 13. Furthermore, there exists the option of backwashing the candle filters 3 by reversing the fluid flow from the clean side 11 in the direction of the untreated side 51.

In the preceding, the tapered candle filters 3 were described as comprising multiple structural parts with support structures 13, 29 and filter medium 21 disposed there-between. However, the candle filters can be envisioned as tapered slotted screen tube elements that would be disposed in corresponding groups having a reversed tapering in relation to each other.

While one embodiment has been chosen to illustrate the invention, it will be understood by those skilled in the art that various changes and modifications can be made therein without departing from the scope of the invention as defined in the claims.

The invention claimed is:

1. A filtering device, comprising:
 a filter housing having a base plate; and
 a plurality of tapered filter candles, each of said filter candles having a body and extending along a longitudinal axis, said filter candles being arranged adjacent to one another in rows in said filter housing with said longitudinal axes thereof being parallel to one another, said filter candles having shapes deviating from circular cylinders by being tapered along at least parts of lengths thereof along said longitudinal axes such that said filter candles have cross-sectional sizes changing at least in part from large axial ends to small axial ends, said filter elements being oriented in said filter housing such that said large axial ends are paired with said small axial ends of said filter candles that are adjacent and such that said filter candles that are adjacent are tapered in opposite directions along said longitudinal axes thereof, said filter candles being grouped as densely packed, said filter candles in a first set of said rows being oriented with said small axial ends adjacent said base plate and in a second set of said rows with said large axial ends adjacent said base plate, said first and second sets of rows being sequential and being laterally offset relative to said longitudinal axes of one another such that sequential ones of said rows of said first and second sets have said filter candles of one of said rows of said first set inside gaps between said filter candles of said second set in an adjacent one of said rows.

2. A filtering device according to claim 1 wherein said filter housing comprises a cover plate spaced from and in a plane parallel to a plane of said base plate, said filter candles being between said base plate and said cover plate.

3. A filtering device according to claim 1 wherein said base plate comprises a connection plate with fluid openings therethrough in fluid communication with fluid passages in said large and small axial ends of said filter candles retained on said base plate, said fluid passages leading to internal cavities of said filter candles.

4. A filtering device according to claim 3 wherein said filter candles comprise tube-shaped internal support structures and filter mediums surrounding said internal filter cavities of said filter candles, ends of said tube-shaped internal support structures connected to said base plate including said fluid passages therein and being engaged in said fluid openings of said base plate.

5. A filtering device according to claim 4 wherein ends of said candle filters adjacent a cover plate of said filter housing have closure pieces disposed at ends of said tube-shaped internal support structures and closing said internal cavities of said filter candles.

6. A filtering device according to claim 4 wherein said tube-shaped internal support structures of said filter candles have said small axial ends of said filter candles at said base plate extended by connection tubes engaging in said fluid openings and being axially attached to said base plate.

7. A filtering device according to claim 1 wherein said filter candles comprise external tube-shaped support structures on outer sides thereof, said external tube-shaped support structures having radially protruding annular edges at said large axial ends of said filter candles.

8. A filtering device according to claim 7 wherein said filter candles comprise tube-shaped internal support structures; and
 said tube-shaped internal support structures have cylinder parts at said small axial ends of filter candles, said cylindrical parts extending through hollow cylindrical collars on said external tube-shaped support structures at said small axial ends of said filter candles, said hollow cylindrical collars being detachably and axially secured to said cylinder parts.

9. A filtering device according to claim 8 wherein said hollow cylindrical collars comprise steps forming shoulders disposed in radial planes and gripped over said annular edges of said external tube-shaped support structures of adjacent ones of said filter candles.

10. A filtering device according to claim 8 wherein said hollow cylindrical collars comprise axially protruding removal parts formed as unitary one-piece structures therewith for removing said filter candles from said filter housing.

11. A filtering device according to claim 4 wherein said tube-shaped internal support structures comprise axially protruding removal parts on closed ends thereof for removing said filter candles from said filter housing.

12. A filtering device, comprising:

a filter housing having a base plate;

a plurality of tapered filter candles, each of said filter candles having a body and extending along a longitudinal axis, said filter candles being arranged adjacent to one another in said filter housing with said longitudinal axes thereof being parallel to one another, said filter candles having shapes deviating from circular cylinders by being tapered along at least parts of lengths thereof along said longitudinal axes such that said filter candles have cross-sectional sizes changing at least in part from large axial ends to small axial ends, said filter elements being oriented in said filter housing such that said large axial ends are paired with said small axial ends of said filter candles that are adjacent and such that said filter candles that are adjacent are tapered in opposite directions along said longitudinal axes thereof;

external tube-shaped support structures on outer sides of the filter candles, said external tube-shaped support structures having radially protruding annular edges at said large axial ends of said filter candles; and tube-shaped internal support structures on inner sides of said filter candles having cylinder parts at said smaller axial ends of filter candles, said cylindrical parts extending through hollow cylindrical collars on said external tube-shaped external support structures at said smaller axial ends of said filter candles, said hollow cylindrical collars being detachably and axially secured to said cylinder parts, said hollow cylindrical collars having steps forming shoulders disposed in radial planes and gripped over said annular edges of said external tube-shaped support structures of adjacent ones of said filter candles.

13. A filtering device according to claim 12 wherein said filter housing comprises a cover plate spaced from and in a plane parallel to a plane of said base plate, said filter candles being between said base plate and said cover plate.

14. A filtering device according to claim 12 wherein said base plate comprises a connection plate with fluid openings therethrough in fluid communication with fluid passages in said large and small axial ends of said filter candles retained on said base plate, said fluid passages leading to internal cavities of said filter candles.

15. A filtering device according to claim 14 wherein ends of said tube-shaped internal support structures connected to said base plate include said fluid passages therein and are engaged in said fluid openings of said base plate.

16. A filtering device according to claim 15 wherein ends of said candle filters adjacent a cover plate of said filter housing have closure pieces disposed at ends of said tube-shaped internal support structures and closing said internal cavities of said filter candles.

17. A filtering device according to claim 15 wherein said tube-shaped internal support structures of said filter candles have said small axial ends of said filter candles at said base plate extended by connection tubes engaging in said fluid openings and being axially attached to said base plate.

* * * * *